(12) United States Patent
Zhou et al.

(10) Patent No.: US 12,288,264 B2
(45) Date of Patent: Apr. 29, 2025

(54) VEHICLE ACCIDENT LOSS ASSESSMENT RISK CONTROL METHOD AND APPARATUS, ELECTRONIC DEVICE AND STORAGE MEDIUM

(71) Applicant: DATA ENLIGHTEN TECHNOLOGY (BEIJING) CO., LTD., Beijing (CN)

(72) Inventors: Kai Zhou, Beijing (CN); Rongbing Zhang, Beijing (CN); Jian Kang, Beijing (CN); Minhao Wang, Beijing (CN); Wei Li, Beijing (CN)

(73) Assignee: DATA ENLIGHTEN TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 18/753,911

(22) Filed: Jun. 25, 2024

(65) Prior Publication Data
US 2024/0428341 A1    Dec. 26, 2024

(30) Foreign Application Priority Data
Jun. 26, 2023    (CN) .......................... 202310757101.2

(51) Int. Cl.
*G06Q 40/08*    (2012.01)
*G07C 5/10*    (2006.01)

(52) U.S. Cl.
CPC .............. *G06Q 40/08* (2013.01); *G07C 5/10* (2013.01)

(58) Field of Classification Search
CPC .................................................... G06Q 40/08
(Continued)

(56) References Cited

U.S. PATENT DOCUMENTS

| 9,147,217 B1 | 9/2015 | Zabritski et al. |
| 11,151,384 B2 | 10/2021 | Zhang et al. |

(Continued)

FOREIGN PATENT DOCUMENTS

| CN | 106600422 A | 4/2017 |
| CN | 105550756 B | 6/2017 |

(Continued)

OTHER PUBLICATIONS

Notification on the Grant of Patent Right for Invention From the National Intellectual Property Administration of the People's Republic of China issued on Oct. 19, 2023.

(Continued)

*Primary Examiner* — Robert R Niquette
(74) *Attorney, Agent, or Firm* — HAUPTMAN HAM, LLP

(57) ABSTRACT

Provided is a vehicle accident loss assessment risk control method and apparatus. The method can include: acquiring a vehicle accident loss assessment report of a current accident of a vehicle, wherein the vehicle accident loss assessment report includes vehicle information of the vehicle and vehicle loss items related to the current accident of the vehicle; calculating the vehicle loss items in the vehicle accident loss assessment report based on a pre-established risk algorithm model in combination with the vehicle information, and identifying risk items with risks in the vehicle loss items; and intercepting the risk items or prompting the risk items to a user. According to the embodiment, an early warning can be automatically made to a leakage that may occur in the vehicle accident loss assessment based on artificial intelligence, industry big data standardization, big data mining analysis and the like, to realize the risk control and ensure the accuracy of vehicle accident loss assessment.

20 Claims, 9 Drawing Sheets

(58) Field of Classification Search
USPC .............................................................. 705/4
See application file for complete search history.

(56) References Cited

U.S. PATENT DOCUMENTS

| | | | |
|---|---|---|---|
| 11,373,249 B1* | 6/2022 | Hayward | ............. G06V 30/274 |
| 2020/0334638 A1* | 10/2020 | Hu | ........................... G06N 7/01 |
| 2020/0349353 A1* | 11/2020 | Guo | ...................... G06V 20/20 |
| 2021/0287297 A1 | 9/2021 | Hayward et al. | |
| 2021/0334540 A1* | 10/2021 | Zhang | ..................... G06N 3/04 |
| 2022/0044330 A1 | 2/2022 | Kuruvilla et al. | |
| 2023/0377047 A1* | 11/2023 | Bouëtté | ................ G06V 10/764 |

FOREIGN PATENT DOCUMENTS

| | | |
|---|---|---|
| CN | 107657047 A | 2/2018 |
| CN | 107871285 A | 4/2018 |
| CN | 108537656 A | 9/2018 |
| CN | 109086967 A | 12/2018 |
| CN | 109164788 A | 1/2019 |
| CN | 109272413 A | 1/2019 |
| CN | 111259848 A | 6/2020 |
| CN | 111260487 A | 6/2020 |
| CN | 111461266 A | 7/2020 |
| CN | 111612640 A | 9/2020 |
| CN | 114092267 A | 2/2022 |
| EP | 4372658 A1 | 5/2024 |
| JP | H0981739 A | 3/1997 |
| JP | 2020518078 A | 6/2020 |
| JP | 2021068267 A | 4/2021 |
| WO | 2009140592 A1 | 11/2009 |
| WO | 2023000737 A1 | 1/2023 |

OTHER PUBLICATIONS

Hou Xuhua Xie Dongqing, "Exploring insurance fraud and anti-fraud in the context of the Internet"—Anonymous • Jun. 28, 2023, 16:08:43 • 905 Read • Accounting Paper.

Japanese Office Action for the related Japanese Patent Application No. 2024-101160 dated Nov. 5, 2024.

* cited by examiner

S2011

Virtualize the vehicle into a corresponding graph in a three-dimensional coordinate system according to the vehicle information of the vehicle, and give a three-dimensional coordinate to a vehicle part according to an actual installation location of the vehicle part in the vehicle

S2012

Divide the vehicle into different collision portions, and create three-dimensional coordinate data for each of the collision portions according to the vehicle information, so as to establish a correspondence between the collision portion and the vehicle part

VEHICLE ACCIDENT LOSS ASSESSMENT RISK CONTROL METHOD AND APPARATUS, ELECTRONIC DEVICE AND STORAGE MEDIUM

CROSS-REFERENCE TO RELATED APPLICATIONS

This application claims priority to Chinese Patent Application No. 202310757101.2, filed on Jun. 26, 2023, the contents of which are hereby incorporated by reference in their entirety for all purposes.

TECHNICAL FIELD

The presently disclosed subject matter relates to the field of vehicle information technology and vehicle loss assessment, and in particular to a vehicle accident loss assessment risk control method and apparatus, an electronic device and a storage medium.

BACKGROUND

With the rapid development of our country's economy, people's consumption level has gradually increased, and vehicles have gradually changed from the previous consumables to the daily transportation tool for families. The vehicle insurance service as a value-added business has also developed rapidly, and the vehicle insurance has become the largest type of insurance in the insurance industry with a market share of 60%. The vehicle insurance is a mandatory insurance business required by our country, and is an insurance business that must be purchased by all motor vehicles. This insurance is mainly to protect against the property or personal losses caused by traffic accidents that may be encountered in the course of driving.

In the process of vehicle claims, survey, loss assessment, and the like, the vehicle accident loss assessment is accurate and reasonable, which is an important core for an insurance company to fulfill the insurance obligations, and is also a key link in the most preposition of the claims process. However, the employees responsible for the vehicle accident loss assessment in insurance companies are affected by their own skills and quality factors, as well as the complexity and professionalism factors of vehicle accident losses. Thus, in the process of vehicle loss assessment, there are often situations where the assessment content is untrue and unreasonable, which leads to claims leakage and inflated compensation costs for insurance companies. How to control the risk of claims and reduce the cost of claims from the source of the vehicle accident loss assessment appears particularly important.

In the process of vehicle accident loss assessment of insurance companies, in order to improve the timeliness of claims settlement and improve the customer satisfaction, the assessment by loss adjusters of insurance companies in the past has been gradually extended to the assessment by the maintenance enterprises undertaking the vehicle maintenance, and even extended to the self-service loss assessment by the vehicle owners for accidents with small losses. However, the maintenance enterprises are driven by interests, and there may inevitably be assessment deviations in the assessment process. Moreover, the self-service loss assessment by the vehicle owners is bound to have the possibility of assessment deviation due to the professional ability factor. Customer needs are constantly changing, and the business form needs to be transformed in the process of meeting the changing customer needs. The traditional empirical assessment and audit method is no longer suitable for the development of the industry, and there is a lack of efficient and intelligent risk control methods, and at the same time, it has been a general trend that the manual experience audit is changed into the machine audit.

The accident loss assessment leakage of the vehicle insurance is currently estimated to be more than RMB 10 billion yuan in the industry, which seriously affects the claims costs of insurance companies, affects the solvency of insurance companies, and leads to a huge waste of social wealth. At the same time, this is also an inherent problem that has been difficult to solve in the insurance industry.

It can be seen that in the process of a vehicle accident loss assessment, it is an urgent issue to consider that how insurance companies can improve the risk identification ability while making an assessment efficiently and accurately, and block the risk leakage in the vehicle accident loss assessment.

SUMMARY

In view of this, embodiments of the presently disclosed subject matter provide a vehicle accident loss assessment risk control method and apparatus, which can automatically make an early warning to a leakage that may occur in the vehicle accident loss assessment based on AI artificial intelligence, industry big data standardization, big data mining analysis, and the like, so as to realize the risk control and ensure the accuracy of vehicle accident loss assessment.

To achieve the above, according to the first aspect of the presently disclosed subject matter, a vehicle accident loss assessment risk control method is provided, including:
  acquiring a vehicle accident loss assessment report of a current accident of a vehicle, wherein the vehicle accident loss assessment report includes vehicle information of the vehicle and vehicle loss items related to the current accident of the vehicle;
  calculating the vehicle loss items in the vehicle accident loss assessment report based on a pre-established risk algorithm model in combination with the vehicle information, and identifying risk items with risks in the vehicle loss items; and
  intercepting the risk items or prompting the risk items to a user.

With the vehicle accident loss assessment risk control method according to the first aspect of the presently disclosed subject matter, the pre-established risk algorithm model can be used to intelligently judge the vehicle accident loss items to be entered or reported in the preliminarily determined vehicle accident loss assessment information of the insured vehicle, thereby calculating risk items with risks and being able to directly carry out a forced interception, or showing and thereby prompting these risk items (which are judged not to belong to the current vehicle accident loss or assessed as unreasonable) to the user in the generated risk control report. Thus, the user can carry out corresponding operations based on the risk items prompted by the system to reduce the risk of a vehicle accident loss assessment, make the result of the vehicle accident loss assessment more accurate and reasonable, achieve the efficient and intelligent risk control of the vehicle accident loss assessment, and greatly reduce the insurance leakage.

With the vehicle accident loss assessment risk control method according to the first aspect of the presently disclosed subject matter, various calculations and judgments are carried out by the pre-established risk algorithm model, that is, the artificial intelligence method is used to carry out the risk assessment by a computer to achieve the machine auditing of the vehicle accident loss assessment. Compared with the traditional manual auditing that relies on the professional technical level of workers, the labor cost is greatly reduced, the time is saved, and the accuracy and objectivity are improved.

In the above vehicle accident loss assessment risk control method, the vehicle information may include: a Vehicle Frame Number VIN, a vehicle nature (a target vehicle/a third-party vehicle), an accident cause (collision, etc.), a loss assessment method (repair loss assessment, etc.).

According to the above vehicle accident loss assessment risk control method, the targeted risk control can be carried out based on the vehicle information, which improves the reliability.

In the above vehicle accident loss assessment risk control method, the pre-established risk algorithm model includes: a vehicle collision portion algorithm model, and the vehicle collision portion algorithm model is established in following steps:
  virtualizing the vehicle into a corresponding graph in a three-dimensional coordinate system according to the vehicle information of the vehicle, and giving a three-dimensional coordinate to a vehicle part according to an actual installation location of the vehicle part in the vehicle; and
  dividing the vehicle into different collision portions, and creating three-dimensional coordinate data for each of the collision portions according to the vehicle information, so as to establish a correspondence between the collision portion and the vehicle part.

In the above vehicle accident loss assessment risk control method, calculation of the vehicle loss items in the vehicle accident loss assessment report based on the vehicle collision portion algorithm model includes at least one of the following:
  calculating collision portions of the current accident according to the vehicle loss items in the acquired current vehicle accident loss assessment report of the vehicle, and comparing the current vehicle accident loss assessment report of the vehicle with a historical vehicle accident loss assessment report of the vehicle to calculate whether there are same collision portions or same damaged parts, and to identify the same collision portions or damaged parts as risk items when a calculation result is yes; and
  when a plurality of collision portions of the vehicle in the current accident are calculated, judging whether there is a collision portion that does not conform to a collision logic among the plurality of collision portions, and when a judgment result is yes, identifying the collision portion that does not conform to the collision logic as a risk item.

In the above vehicle accident loss assessment risk control method, the pre-established risk algorithm model includes: a vehicle collision portion damage degree algorithm model, which is established in following steps:
  manually marking the collision portions and damage degrees for historical vehicle accident cases according to historical vehicle accident loss assessment reports of various types of vehicles in combination with loss photos of historical vehicle accident loss assessments; and
  machine learning by a computer the historical vehicle accident loss assessment reports of various types of vehicles and a portrait of the collision portions and damage degrees according to the collision portions and the damage degrees manually marked for the historical vehicle accident cases, so as to obtain a correspondence between the collision portions and the damage degrees and the vehicle loss items.

In the above vehicle accident loss assessment risk control method, calculation of the vehicle loss items in the vehicle accident loss assessment report based on the vehicle collision portion damage degree algorithm model includes:
  calculating damage degrees of the collision portions of the current accident according to the vehicle loss items in the acquired current vehicle accident loss assessment report of the vehicle and the collision portions calculated by the vehicle collision portion algorithm model, so as to determine a parts loss boundary under the collision portions and the damage degrees, judge whether the damaged parts include a damaged part outside the parts loss boundary, and identify the damaged part outside the parts loss boundary as the risk item when the judgment result is yes.

In the above vehicle accident loss assessment risk control method, the pre-established risk algorithm model includes:
  a vehicle parts damage correlation density model, which is established in following steps:
  taking records in historical vehicle accident loss assessment reports of various types of vehicles as sample data to conduct a big data mining analysis, and calculate and store a damage correlation density between various vehicle parts when the vehicle is damaged in an accident,
  wherein the damage correlation density comprises at least one of the following: when one vehicle part is damaged and thus becomes a damaged part, a probability that another vehicle part also becomes a damaged part accordingly; and when one vehicle part is damaged and thus becomes a damaged part, a probability that another vehicle part will not become a damaged part.

In the above vehicle accident loss assessment risk control method, calculation of the vehicle loss items in the vehicle accident loss assessment report based on the vehicle parts damage correlation density model includes at least one of the following:
  identifying whether another part having a strong correlation with one damaged part included in the vehicle loss items is also recorded in the vehicle loss items as a damaged part, according to the vehicle loss items in the acquired current vehicle accident loss assessment report of the vehicle in combination with the damage correlation density, and identifying the one damaged part as the risk item when an identification result is unrecorded,
  wherein the strong correlation means that when one vehicle part is damaged and thus becomes a damaged part, a probability that another vehicle part also becomes a damaged part accordingly is higher than a predetermined threshold.

In the above vehicle accident loss assessment risk control method, the pre-established risk algorithm model includes:
  a vehicle original standard configuration information model, which is established by conducting big data standardization on vehicle original configuration information,
  wherein the vehicle original configuration information comprises at least one of the following: vehicle original configuration data, parts codes, parts usage amount of a single vehicle, relationships between parts assembly and accessories, parts guide prices and usage amount of auxiliary materials.

In the above vehicle accident loss assessment risk control method, calculation of the vehicle loss items in the vehicle accident loss assessment report based on the vehicle original standard configuration information model includes:

identifying, according to the vehicle information, vehicle original configuration information corresponding to the vehicle using the vehicle original standard configuration information model, and comparing information of the damaged parts in the vehicle loss items with the vehicle original configuration information, and when a comparison result of the two is inconsistent, identifying the damaged parts that are inconsistent as risk items.

In the above vehicle accident loss assessment risk control method, the pre-established risk algorithm model includes:

a vehicle parts standard maintenance process model, which is established by conducting big data standardization on maintenance technical data and maintenance process standards for vehicle parts.

In the above vehicle accident loss assessment risk control method, calculation of the vehicle loss items in the vehicle accident loss assessment report based on the vehicle parts standard maintenance process model includes:

comparing, according to the vehicle information, maintenance information of the damaged parts in the vehicle loss items with the maintenance technical data and maintenance process standards by using vehicle parts standard maintenance process model, and when a comparison result of the two is inconsistent, identifying the damaged parts that are inconsistent as risk items.

With the above vehicle accident loss assessment risk control method according to the first aspect of the presently disclosed subject matter, as a risk control calculation basis, the pre-established risk algorithm model has at least five dimensions of models, namely, a vehicle collision portion algorithm model, a vehicle collision portion damage degree algorithm model, a vehicle parts damage correlation density model, a vehicle original standard configuration information model, and a vehicle parts standard maintenance process model. Four aspects, i.e., the collision portion and damage degree of the vehicle accident, the accident damage correlation density between the parts, the original standard configuration and the maintenance process are comprehensively considered. Based on the data of the historical real cases, machine learning is carried out according to the contents of the vehicle loss assessment report, which can identify the vehicle collision portion and the damage degree; through the data mining algorithm, the probability calculation can be carried out on the events that do not result in parts damages for different brands of vehicle models, different collision portions, and different collision damage degrees; the big data standardization is carried out on vehicle original configuration data, parts data, maintenance technical data, maintenance process standards and the like, which can form a set of big data rules for loss assessment risk identification and judgment. Therefore, a comprehensive, reliable, accurate and intelligent risk control can be carried out, which improves the risk control capability.

Moreover, with the above vehicle accident loss assessment risk control method according to the first aspect of the presently disclosed subject matter, an efficient, intelligent and convenient vehicle accident loss risk control tool is provided for the industry. It breaks through the mode and concept of the traditional vehicle accident loss risk control, and innovates the technology, i.e., innovates from the traditional rule of thumb to the big data mining analysis. The manual experience audit is transformed into the machine audit, which greatly improves the audit efficiency, saves the claims cost in the insurance industry, and avoids the waste of social wealth. A set of perfect risk control system is formed based on the AI artificial intelligence, industry big data standardization and big data mining analysis, which solves the pain points of the industry.

In the above vehicle accident loss assessment risk control method, a user selects whether to carry out a risk correction for a description of each risk item prompted, after a risk is prompted to the user, and when selecting to carry out the risk correction, carries out a risk identification and judgment based on the risk algorithm model again.

According to the above vehicle accident loss assessment risk control method implemented, the calibration and cycle control of risk items can be achieved based on the user selection, which improves the operability and accuracy.

The second aspect of the presently disclosed subject matter provides a vehicle accident loss assessment risk control apparatus, including:

an acquisition unit, configured to acquire a vehicle accident loss assessment report of a current accident of a vehicle, wherein the vehicle accident loss assessment report includes vehicle information of the vehicle and vehicle loss items related to the current accident of the vehicle;

a risk identification and judgment unit, configured to calculate the vehicle loss items in the vehicle accident loss assessment report based on a pre-established risk algorithm model in combination with the vehicle information, and identify risk items with risks in the vehicle loss items, wherein the risk items are items that are judged not to belong to the current vehicle accident loss or assessed as unreasonable; and a risk processing unit, configured to intercept the risk items or prompt the risk items to a user.

With the vehicle accident loss assessment risk control apparatus according to the second aspect of the presently disclosed subject matter, various technical effects similar to those in the first aspect can be achieved.

The third aspect of the presently disclosed subject matter provides an electronic device, including: one or more processors; and a storage device, configured to store one or more programs that, when executed by the one or more processors, cause the one or more processors to implement the method according to the first aspect.

The fourth aspect of the presently disclosed subject matter provides a computer-readable medium having computer programs stored thereon, the programs implementing the method according to the first aspect when being executed by a processor.

The second to fourth aspects of the presently disclosed subject matter can achieve the same technical effect as the first aspect.

Further effects of the non-customary alternative mentioned above will be described below in conjunction with specific embodiments.

BRIEF DESCRIPTION OF THE DRAWINGS

The accompanying drawings are used for a better understanding of the presently disclosed subject matter and do not constitute improper limitations on the presently disclosed subject matter, in which

FIG. 2 is a schematic diagram of establishment steps of a vehicle collision portion algorithm model;

FIG. 6 is an exemplary diagram of a risk report in an example of a vehicle accident loss assessment risk control method according to an embodiment of the presently disclosed subject matter;

DETAILED DESCRIPTION

Exemplary embodiments of the presently disclosed subject matter are described below in conjunction with the accompanying drawings, wherein various details of the embodiments of the presently disclosed subject matter are included to help understanding, and they should be considered as merely exemplary. Therefore, those of ordinary skill in the art should recognize that various changes and modifications can be made to the embodiments described herein without departing from the scope and spirit of the presently disclosed subject matter. Similarly, for clarity and conciseness, descriptions of well-known functions and structures are omitted in the following descriptions.

The vehicles involved in the vehicle accident loss assessment risk control method in the present application are particularly suitable for, but not limited to, four-wheeled passenger cars.

Figure 1:
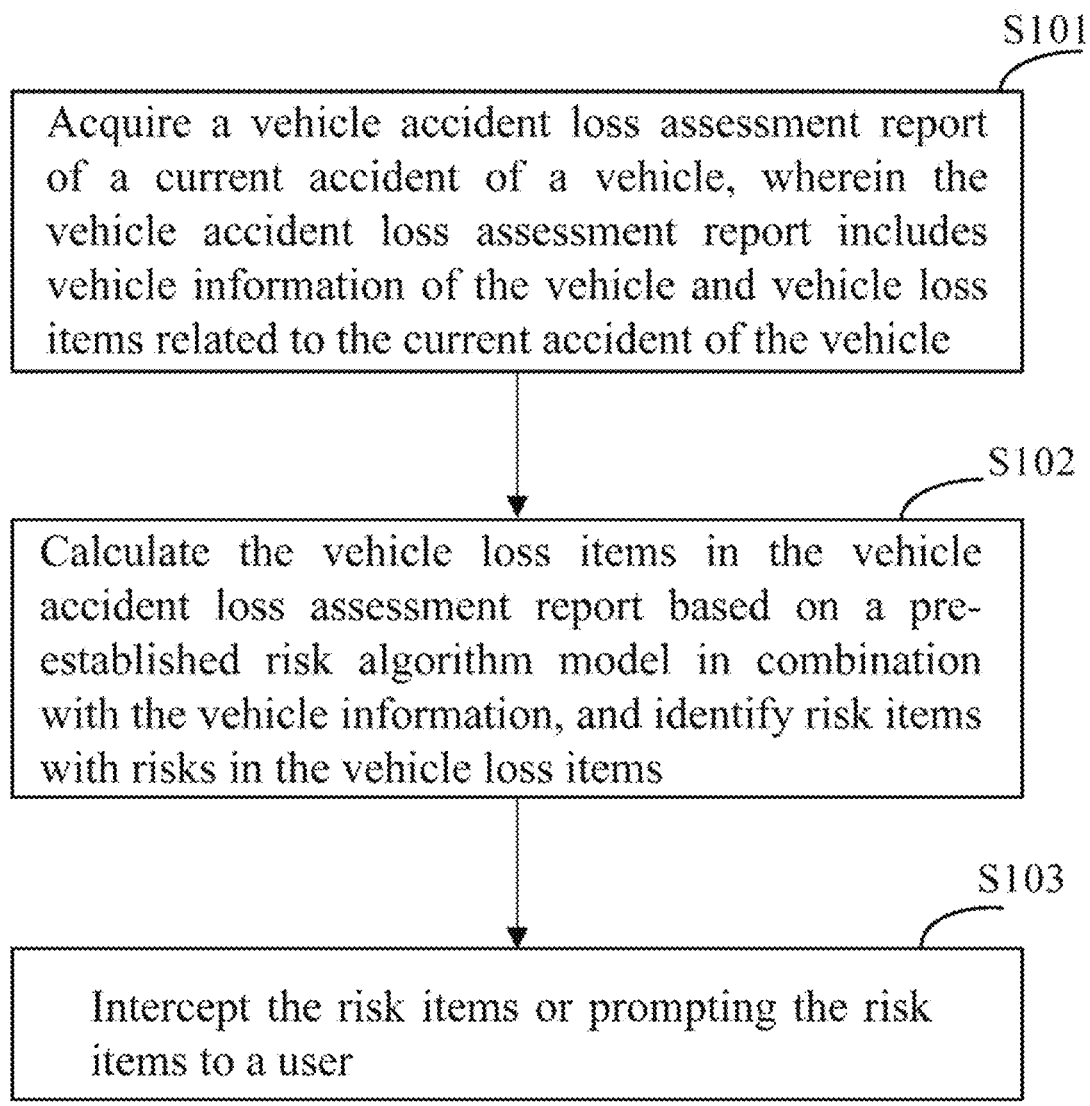
FIG. 1 is a schematic diagram of a main flow of a vehicle accident loss assessment risk control method according to an embodiment of the presently disclosed subject matter.

FIG. 1 is a schematic diagram of a main flow of a vehicle accident loss assessment risk control method according to an embodiment of the presently disclosed subject matter. As shown in FIG. 1, the vehicle accident loss assessment risk control method according to an embodiment of the presently disclosed subject matter mainly includes Steps S101 to S103.

In Step S101, the system can acquire a vehicle accident loss assessment report of a current accident of a vehicle, wherein the vehicle accident loss assessment report includes vehicle information of the vehicle and vehicle loss items related to the current accident of the vehicle. The vehicle information mentioned herein may include a vehicle brand and a vehicle model; a Vehicle Frame Number VIN; a vehicle nature, such as a target vehicle/a third-party vehicle; an accident cause, such as a collision, etc.; a loss assessment method, such as repair loss assessment, etc. Moreover, the vehicle loss items may include damaged parts information related to the damaged parts, maintenance process information of the damaged parts, and the like.

In addition, it should be noted that the system acquires a vehicle accident loss assessment report of a current accident of a vehicle, which may include at least two scenarios. Scenario one may be that a user acquires the vehicle accident loss assessment information by manually entering or typing the required information into the system. Scenario 2 may be that, the vehicle accident loss assessment report is acquired by connecting a vehicle accident loss assessment report which has established by a third party (such as a maintenance factory) to the system. Therefore, the vehicle accident loss risk control method of this embodiment has high versatility, and it is not only applicable to the scenario in which the vehicle accident loss assessment information is acquired directly by the present system, but also applicable to the scenario in which the established vehicle accident loss information provided by the third party is acquired and the risk assessment calculation is performed.

In Step S102, the system can calculate the vehicle loss items in the vehicle accident loss assessment report based on a pre-established risk algorithm model in combination with the vehicle information, and identify risk items with risks in the vehicle loss items. The risk items mentioned here refer to the items that are judged not to belong to the current vehicle accident loss or assessed as unreasonable.

In Step S103, the system can intercept the risk items or prompt the risk items to a user. More specifically, the system can generate a risk control report and preview it to the user. The risk control report may list the risk item names, rule names (risk causes, etc.), rule classifications (fraud prevention cases, loss logic, etc.), operation suggestions, deductible amounts, remarks, etc. for the prompt class.

According to the vehicle accident loss assessment risk control method in this embodiment in Steps S101 to S103, the pre-established risk algorithm model can be used to intelligently judge the vehicle accident loss items to be entered or reported in the preliminarily determined accident loss assessment information of the insured vehicle, thereby calculating risk items with risks and being able to for example directly carry out an interception, or for example generating a risk control report and showing these risk items to the user so as to carry out a risk prompt. The user can carry out corresponding operations based on the risk items prompted by the system to reduce the risk of vehicle accident loss assessment, make the result of vehicle accident loss assessment more accurate and reasonable, achieve the efficient and intelligent risk control of vehicle accident loss assessment, and greatly reduce the insurance leakage. Moreover, various calculations and judgments are carried out by the pre-established risk algorithm model, that is, the artificial intelligence method is used to carry out the risk assessment by a machine to achieve the machine auditing of the vehicle accident loss assessment. Compared with the traditional manual auditing that relies on the professional technical level of workers, the labor cost is greatly reduced, the time is saved, and the accuracy and objectivity are improved.

According to an embodiment of the presently disclosed subject matter, the pre-established risk algorithm model in Step S102 may include: a vehicle collision portion algorithm model, which is used to calculate the vehicle collision portions involved in the current accident of the vehicle, and identify the risk items based on the calculation result; a vehicle collision portion damage degree algorithm model, which is used to calculate damage degrees of the vehicle collision portions and identify the risk items based on the calculation result; a vehicle parts damage correlation density model, which is used to identify the risk items with risks in the vehicle loss items according to the damage correlation density between respective vehicle parts; a vehicle original standard configuration information model, which is used to identify whether the damaged parts information of the damaged parts matches the vehicle parts original configuration information and the vehicle parts original standard information, thereby identifying the risk items; and a vehicle parts standard maintenance process model, which is used to calculate whether the maintenance information of the damaged parts matches the maintenance technical data and the maintenance process standard, thereby identifying the risk items.

It should be noted that although it is illustrated above that the risk algorithm model includes five models, i.e., the vehicle collision portion algorithm model, a vehicle collision portion damage degree algorithm mode, the vehicle parts damage correlation density model, the vehicle original standard configuration information model, and the vehicle parts standard maintenance process model, this is not restrictive. For example, the risk algorithm model may include at least one of them.

For the vehicle collision portion algorithm model in this embodiment, it may be pre-established by the following steps: virtualizing the vehicle into a corresponding graph in a three-dimensional coordinate system according to the vehicle information of the vehicle, and giving a three-dimensional coordinate to a vehicle part according to an actual installation location of the vehicle part in the vehicle (corresponding to S2011 in FIG. 2); dividing the vehicle into different collision portions, and creating three-dimensional coordinate data for each of the collision portions according to the vehicle information, so as to establish a correspondence between the collision portion and the vehicle part (corresponding to S2012 in FIG. 2).

More specifically, the three-dimensional coordinate gyroscope data for the installation locations of vehicle parts is created. According to different body forms of vehicles (mainly divided into six types: sedan four-door, sedan two-door, hatchback four-door, SUV, MPV, and van), the vehicles are virtualized into corresponding three-dimensional graphs, such as a cuboid, and a three-dimensional coordinate system for the installation locations of the parts is established. If a sedan belongs to a sedan four-door body, a three-dimensional coordinate system may be established as: the X-axis (left to right of the vehicle) coordinate=(1, 2, 3, 4, 5, 6, 7, 8, 9); the Y-axis (front to rear of the vehicle) coordinate=(1, 2, 3, 4, 5, 6, 7, 8, 9, 10, 11, 12); and the Z-axis (bottom to top of the vehicle) coordinate=(1, 2, 3). According to the actual installation locations of the parts in the vehicle, the three-dimensional coordinates of the installation locations of the parts are determined. For example, the "headlight assembly (left)" in the sedan may have three-dimensional coordinates of (1, 1, 2) and (2, 1, 2).

In addition, the vehicle collision portions are created and the three-dimensional coordinate areas are defined for the portions. The appearance of the vehicle body is divided into 10 collision portions in total: front collision, front left side collision, front right side collision, middle left side collision, middle right side collision, rear collision, rear left side collision, rear right side collision, vehicle top collision and vehicle bottom collision. The three-dimensional coordinate data is created for each collision portion area according to the vehicle body form, so that the names of the parts included in each collision portion can be calculated according to the vehicle body forms parsed by the vehicle identification numbers of different vehicles, and the actual installation location coordinates of the parts.

Figure 3:
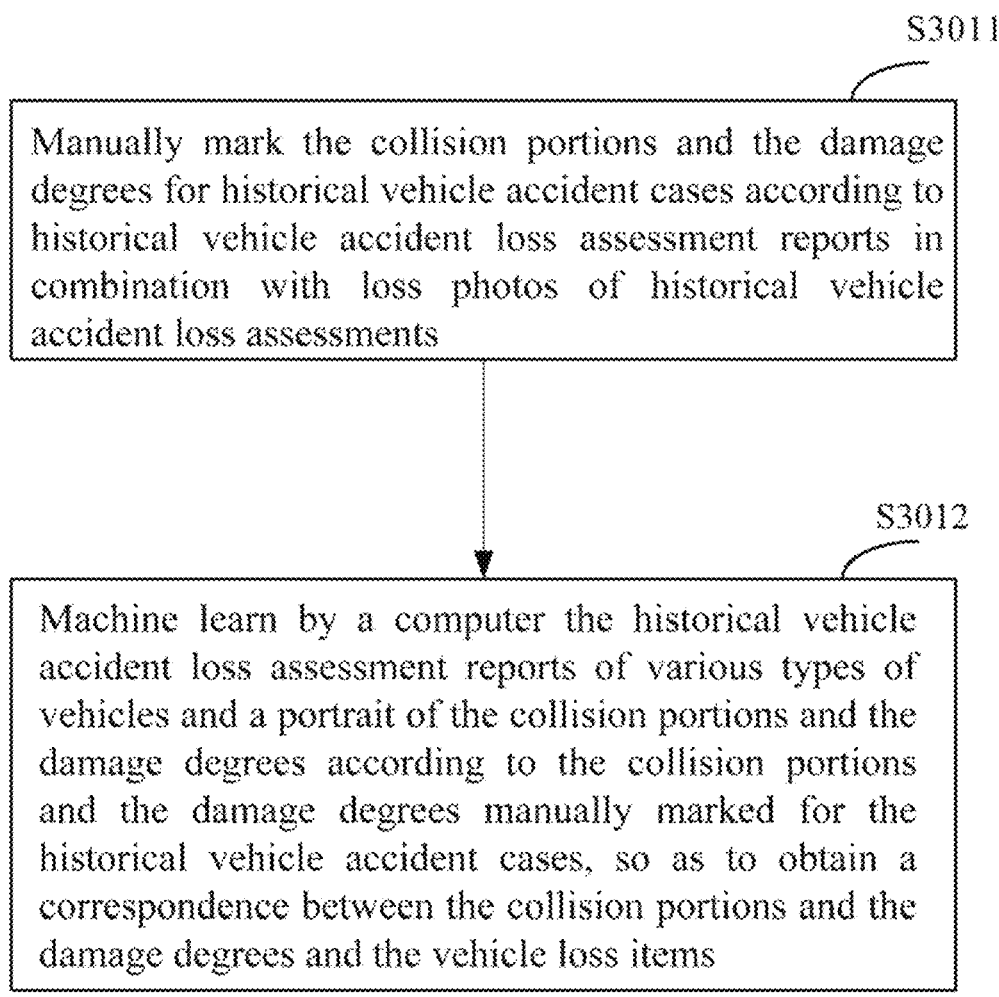
FIG. 3 is a schematic diagram of establishment steps of a vehicle collision portion damage degree algorithm model.

The vehicle collision damage degree algorithm model may be obtained as follows: taking historical vehicle accident loss assessment reports of various types of vehicles as sample data to carry out computer machine learning, so as to establish a correspondence between the damage degrees of the collision portions and the accident loss items. More specifically, for example, it is established by the steps shown in FIG. 3. Referring to FIG. 3, in Step S3011, the collision portions and the damage degrees are manually marked for historical vehicle accident cases according to historical vehicle accident loss assessment reports in combination with loss photos of historical vehicle accident loss assessments; in Step S3012, the computer machine learns the historical vehicle accident loss assessment reports of various types of vehicles and a portrait of the collision portions and the damage degrees according to the collision portions and the damage degrees manually marked for the historical vehicle accident cases, so as to obtain a correspondence between the collision portions and the damage degrees and the vehicle loss items.

In this embodiment, the vehicle collision damage degree may be divided into five types: slight collision damage, light collision damage, moderate collision damage, heavy collision damage, and extremely heavy collision damage. For example, as described above, the collision portions and the collision damage degrees are manually marked for the historical vehicle accident loss assessment report according to the loss photos of historical vehicle damage assessments; the computer machine learns the loss assessment reports of various types of vehicles and a portrait of various collision portions and collision damage degrees according to the collision portions and the damage degrees manually marked for the historical vehicle accident loss assessment report. Thereby, the correlation between the collision portions and the damage degrees and the accident loss items can be obtained by learning, and the vehicle collision portion damage degree algorithm model can be established. For example, in a case shown in FIG. 4 below, based on the vehicle collision portion algorithm model, when the loss assessment report includes the damaged parts such as the headlight assembly (right), the front bumper crust, and the front fender (right), the computer can accurately identify through these damaged parts that the accident belongs to the form of "front right side collision, light collision damage", according to the correspondence table. Moreover, the probability that a loss item will not occur can be calculated simultaneously for different vehicle models (such as FAW Audi, 2022 A6L), different vehicle bodies (such as three-box four-door), different collision portions, and different collision damage degrees.

In addition, for example, the damaged parts and the collision portions can be obtained according to the loss assessment report. Further, it is possible to judge whether the damaged parts are core parts of the vehicle, and to judge the accident damage degree according to the damage to the core parts. The core parts may be, for example, the parts of the vehicle that carry the collision force, or the parts that may be visually detected to be damaged or not, and that have a significant impact on the amount of loss. The parts that carry the collision force, for example, are the front longitudinal beam assembly (right), the front longitudinal beam assembly (left), the front shock absorber seat (right), the intake manifold, the front axle, etc. The parts that have a significant impact on the amount of loss, for example, are the engine cylinder block assembly, the engine cylinder head assembly, the oil pan, the steering gear, etc. For example, when there is no damage to the core parts, the collision damage degree may be judged as a slight collision damage or a light collision damage. When there is a damage to the core parts, and the maintenance or replacement needs to be carried out on the core parts, the collision damage degree may be determined as a moderate collision damage, a heavy collision damage or an extremely heavy collision damage. According to the loss assessment report, it is obtained that, for example, the collision portions are the front face and the right front corner, and the damaged parts are "the front longitudinal beam assembly (right) (maintenance)", "the front shock absorber seat (right) (maintenance)", and "the intake manifold (replacement)", so that it can be calculated that the collision damage degrees are a heavy collision in the front face and a heavy collision in the right front corner.

Further, based on the damaged parts, the collision portions, and the calculated collision damage degrees, and according to the above correspondence (the vehicle collision portion damage degree algorithm model) between the collision portions and the damage degrees and the accident loss items obtained based on historical big data learning, an estimated list of damaged parts is calculated. The list of damaged parts includes, for example, the damaged parts in a loss assessment report and other correlated estimated damaged parts. The risk items are judged based on the obtained list of parts.

In addition, by using the vehicle collision portion damage degree algorithm model, after the damage degrees of the collision portions of the current accident are calculated, the parts loss boundary under the collision portions and the damage degrees can also be determined.

The parts within the loss range may be determined according to the collision portions, so as to determine the parts loss boundary. For example, if the collision portion is the front face of the vehicle, then it may be determined that the parts within the vehicle loss range include the parts in the front face of the vehicle such as headlights, etc. When the parts in the estimated list of damaged parts calculated above exceed the above determined loss range, i.e., the parts loss boundary, then the parts are judged to be incorrectly estimated parts. For example, if a rear door is included in the estimated list of damaged parts, while the loss rage (the parts loss boundary) is the part in the front face of the vehicle, then the rear door is determined to be an incorrectly estimated part. In addition, the parts within the loss range may also be determined according to both the collision portions and the damage degrees, so as to determine the parts loss boundary. For example, if the collision portion is the front face, and the damage degree is a heavy collision in the front face of the vehicle, the parts within the loss range may be determined to include the parts in the front face of the vehicle, the damaged core parts (such as the front longitudinal beam assembly) and the nearby parts thereof.

For example, when it is determined to be a state of front collision and slight collision damage, it can be determined based on the big data mining of historical cases that the loss boundary in this case should be external parts, and should not include internal parts. If it is determined that there is an engine assembly damage in the vehicle accident loss assessment report, this does not meet the loss boundary because the front slight collision should not include the engine assembly damage.

In view of the above, the vehicle collision portion algorithm model can be used to carry out at least one of the following calculations on the vehicle loss items in the vehicle accident loss assessment report: calculating collision portions of the current accident according to the vehicle loss items in the acquired current vehicle accident loss assessment report of the vehicle, and comparing the current vehicle accident loss assessment report of the vehicle with a historical vehicle accident loss assessment report of the vehicle to calculate whether there are same collision portions or same damaged parts, and to identify the same collision portions or damaged parts as risk items when a calculation result is yes; and when a plurality of collision portions of the vehicle in the current accident are calculated, judging whether there is a collision portion that does not conform to a collision logic among the plurality of collision portions, and when a judgment result is yes, identifying the collision portion that does not conform to the collision logic as the risk item.

Moreover, the vehicle collision portion damage degree algorithm model can be used to calculate damage degrees of the collision portions of the current accident according to the vehicle loss items in the acquired current vehicle accident loss assessment report of the vehicle and the calculated collision portions, so as to determine a parts loss boundary under the collision portions and the damage degrees, judge whether the damaged parts include any damaged part outside the parts loss boundary, and identify the damaged part outside the parts loss boundary as the risk item when the judgment result is yes.

In addition, whether there is a collision portion that does not conform to a collision logic among the plurality of collision portions as mentioned above is, for example, a case in which the collision portions are not adjacent to each other, or a case in which the collision portions are discrete. For example, it is calculated by using the vehicle collision portion algorithm model that the collision portions of a vehicle accident are front collision, left front collision, and rear collision. At this time, the non-adjacent or discrete rear collision is the collision portion that does not conform to the collision logic.

For the vehicle parts damage correlation density model shown in FIG. 2, it may be established by taking records in historical vehicle accident loss assessment reports of various types of vehicles as sample data to conduct a big data mining analysis, and calculate and store a damage correlation density between various vehicle parts when the vehicle is damaged in an accident, wherein the damage correlation density includes at least one of the following: when one vehicle part is damaged and thus becomes a damaged part, a probability that another vehicle part also becomes a damaged part accordingly.

The big data mining calculation is carried out on the correlation density of the parts in the accident damage according to the historical vehicle damage assessment report to acquire the correlation of the accident damages of two parts A, B of the same brand vehicle model, including: a calculation of "Confidence", i.e., a probability that a damage also occurs to part B when a damage occurs to part A of the vehicle based on the historical vehicle data. Bayes' theorem may be used for the calculation, expressed as $$\text{Confidence}\ (A \rightarrow B) = \frac{\text{Support}\ (A \cup B)}{\text{Support}\ (A)},$$

where Support (A) represents the number of times that a damage occurs to part A in the historical data; and Support (A ∪ B) represents the number of times that a damage occurs to part A and part B at the same time in the historical data. When the calculated probability that a damage occurs to part A and part B at the same time is greater than a predetermined threshold, it may be judged that there is a correlation between part A and part B. Based on the correlation between the damaged parts, the parts in the list of the parts loss obtained above are judged, so as to determine the risk items. Therefore, the risk identification can be carried out on the loss items in the vehicle accident loss assessment report based on the vehicle parts damage correlation density model. For example, if it is calculated that there is a correlation between the two parts A, B, when it is identified that there is a damage to part A but no damage to part B in the report, part A will be judged as the risk item.

replacement}, or ={Headlight assembly (right) replacement}, or ={Headlight assembly (left) replacement}, or ={Front fender (left) painting}, or ={Radiator frame replacement}, or ={Center Grid Replacement}, etc., which represent loss events of part B. In order to ensure the strong correlation between the loss event of part A and the loss events of part B, the thresholds are set: Confidence (A→B)≥ 0.5; Lift (a→b)≥0.5; and Conviction (a→b)>1. At this point, based on the sample data of these historical vehicle accident cases, as shown in the following table, and according to the above-mentioned formulas, the "Support", "Confidence", "Lift" and "Conviction" in each corresponding situation can be calculated.

TABLE 1

| all_count | A_part_name | A_count | B_part_name | B_count | A_B_count | A Support | B Support | Confidence (A ->B) | Lift (A->B) | Conviction (A->B) |
|---|---|---|---|---|---|---|---|---|---|---|
| 5861998 | {Front bumper frame replacement} | 409296 | {Front bumper crust replacement} | 1538505 | 362630 | 0.069822 | 0.262454 | 0.885985 | 3.375771 | 6.468834 |
| 5861998 | {Front bumper frame replacement} | 409296 | {Center Grid replacement} | 1097474 | 332904 | 0.069822 | 0.187218 | 0.813358 | 4.344431 | 4.354752 |
| 5861998 | {Front bumper frame replacement} | 409296 | {Engine hood painting} | 1010452 | 318127 | 0.069822 | 0.172373 | 0.777254 | 4.509133 | 3.715564 |
| 5861998 | {Front bumper frame replacement} | 409296 | {Front bumper liner replacement} | 729084 | 258494 | 0.069822 | 0.124375 | 0.631558 | 5.077864 | 2.37656 |
| 5861998 | {Front bumper frame replacement} | 409296 | {Headlight assembly (left) replacement} | 825116 | 246733 | 0.069822 | 0.140757 | 0.602823 | 4.282727 | 2.163375 |
| 5861998 | {Front bumper frame replacement} | 409296 | {Headlight assembly (right) replacement} | 823126 | 242198 | 0.069822 | 0.140417 | 0.591743 | 4.214173 | 2.105494 |
| 5861998 | {Front bumper frame replacement} | 409296 | {Front fender (left) painting} | 1079009 | 230790 | 0.069822 | 0.184068 | 0.563871 | 3.063374 | 1.870848 |
| 5861998 | {Front bumper frame replacement} | 409296 | {Radiator frame replacement} | 464757 | 213110 | 0.069822 | 0.079283 | 0.520675 | 6.567288 | 1.92086 |

In addition, the correlation between the parts may be determined by further calculating "Lift" and "Conviction" in addition to "Confidence". "Lift" is to measure the independence of damages between the two parts A, B, $$\text{Lift}(A \rightarrow B) = \frac{\text{Support}(A \cup B)}{\text{Support}(A) * \text{Support}(B)};$$

and "Conviction" is to measure the probability of the rule prediction error, and represents the probability that event A occurs while event B does not occur.

The strength of the correlation between the vehicle parts may be determined. For example, the strong correlation between the vehicle parts means that when one vehicle part is damaged and thus becomes a damaged part, a probability that another vehicle part also becomes a damaged part accordingly is higher than a predetermined threshold (e.g., 90%). In more detail, when "Confidence" is higher than a predetermined threshold, it is confirmed whether "Support", "Lift" and "Conviction" are also higher than their respective predetermined thresholds, respectively, and if the confirmation result is positive, then it is considered that there is a strong correlation between the vehicle parts.

For example, when creating a vehicle parts damage correlation density model, the record with a total of 5861998 historical vehicle accident cases is taken as a sample to calculate the probability that a loss item occurs to part B when a loss item occurs to part A. Here, it is assumed that A={Front bumper frame replacement}, which represents a loss event of part A; B={Engine hood painting}, or ={Front bumper liner replacement}, or ={Front bumper crust Thus, through the above table, in the 5861998 historical vehicle accident loss cases, it is calculated that when the loss item of {Front bumper frame replacement}, i.e., the loss event of part A occurs, the probability that the loss item of {Front bumper cover replacement}, i.e., the loss event of part B occurs, that is, the "Confidence" is 0.885985, which belongs to the strong correlation event. At this point, if the data of the loss item of "front bumper frame replacement" is entered into the risk assessment report of the current accident, the data will enter the vehicle parts damage correlation density model for calculation. If the calculation result is that the loss item of "front bumper crust replacement" having a strong correlation with "front bumper frame replacement" is not entered into the risk assessment report of the current accident, then the vehicle parts damage correlation density model outputs the loss item of "front bumper frame replacement" as the data of the risk control items.

According to the above vehicle accident loss assessment risk control method in this embodiment, the vehicle collision portion damage degree algorithm model and the vehicle parts damage correlation density model can be established and improved accurately, reliably and intelligently based on historical real data, and the risk identification and judgment can be carried out.

In addition, the vehicle original standard configuration information model and the vehicle parts standard maintenance process model shown in FIG. 2 are described as follows.

The vehicle original standard configuration information model is established, for example, by performing big data standardization on the vehicle original configuration information, and is related to the vehicle parts original configuration information and the vehicle parts original standard information. The vehicle parts original configuration information and the vehicle parts original standard information, for example, include the big data such as vehicle original configuration data, parts codes, parts usage amount of a single vehicle, relationships between parts assembly and components, parts guide prices, the usage amount of auxiliary materials such as engine oil, and the like.

When a vehicle leaves the factory, each vehicle has a unique vehicle identification number identity, and each vehicle has an original configuration standard based on the vehicle identification number. For example, the headlights have different functional configuration standards such as halogen, xenon, and self-adaptive adjustment functions. The price of parts varies greatly with different vehicle model configurations. The system can accurately analyze the vehicle identification number to identify the function configuration standard of the vehicle, can also identify the corresponding configuration standard for the parts in the vehicle accident loss assessment report, and carry out the risk identification and judgment on them. The risks that do not meet the original configuration standards are identified and judged so as to carry out the risk interception.

Based on the vehicle identification number identity, the vehicle has standards for the parts usage amount of a single vehicle, and the relationship between the assembly and the components. The damaged parts in the vehicle accident loss assessment report are compared to identify whether there is a situation where the parts usage amount of a single vehicle exceeds the standard, and losses occur to the assemblies and the components at the same time, so as to carry out the risk interception. For example, for the "headlight assembly (left)", the parts original usage amount of a single vehicle is "1", and if it is "2" in the vehicle accident loss assessment report, it exceeds the standard. For example, for the "headlight assembly (left)", the parts are assemblies and have include a component "headlight housing (left)", and if "losses of the headlight assembly (left) and headlight housing (left)" occur at the same time in the vehicle accident loss assessment report, the risk interception is carried out.

The vehicle parts standard maintenance process model is established, for example, by conducting big data standardization on maintenance technical data and maintenance process standards for vehicle parts. Vehicle parts have standard maintenance processes. For example, the "front bumper crust" cannot be repaired in the manner of "replacement" and "repair" at the same time, and replacement and repair are two mutually exclusive maintenance processes. Therefore, based on the vehicle parts standard maintenance process model, it is assessed whether there are mutually exclusive maintenance processes in the report, and if so, the risk interception is carried out.

Figure 4:
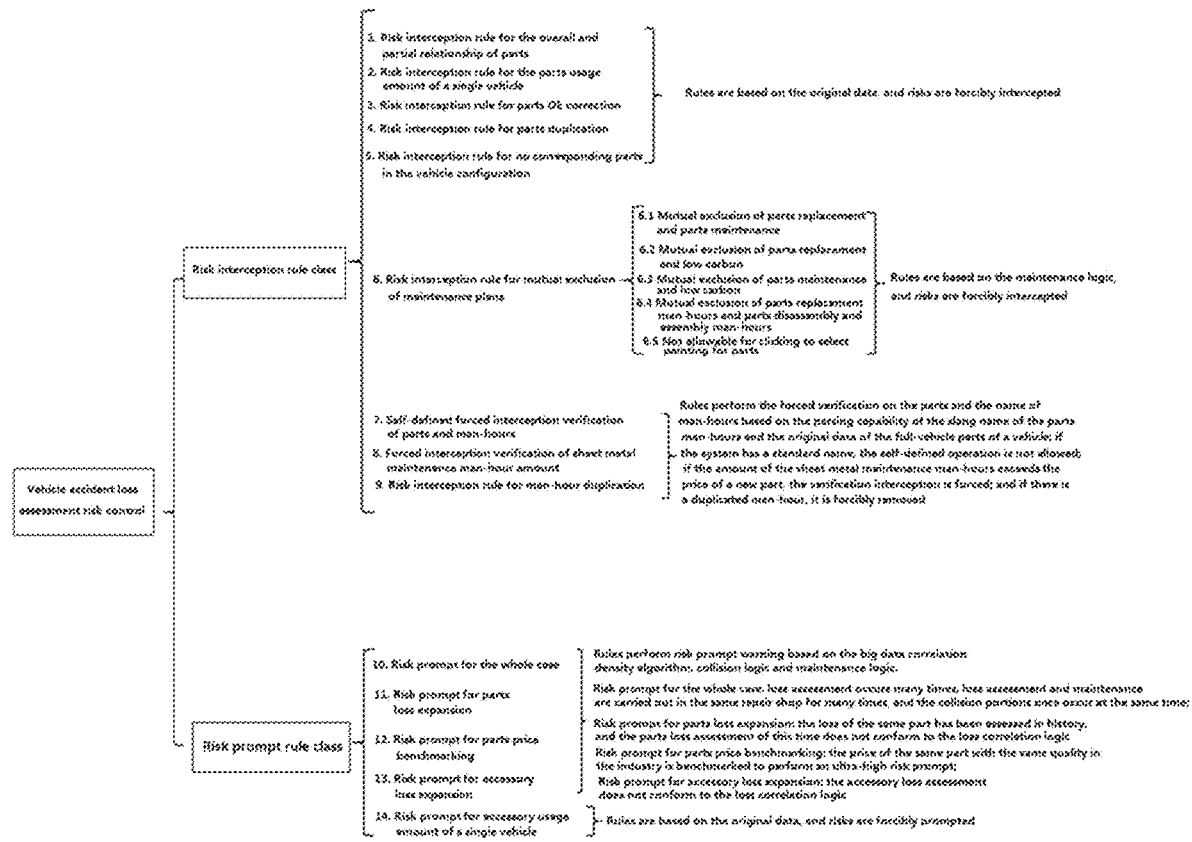
FIG. 4 is a schematic diagram of rules for classifying risk items according to risk levels.

FIG. 4 is an exemplary diagram showing operation rules of risk items, which can be calculated by the corresponding vehicle collision portion algorithm model, vehicle collision portion damage degree algorithm model, vehicle parts damage correlation density model, vehicle original standard configuration information model and vehicle parts standard maintenance process model. As shown in the figure, in this embodiment, the risk items are divided into a risk interception rule class and a risk prompt rule class whose risk level is lower than that of the risk interception rule class. In general (non-limiting), the risk items calculated by the vehicle parts standard maintenance process model and the vehicle original standard configuration information model may be classified into the risk interception rule class, and are forcibly intercepted so that the risk items corresponding to the risk interception rule class are removed or modified from vehicle accident loss assessment information. The risk items calculated by the vehicle collision portion algorithm model, the vehicle collision portion damage degree algorithm model and the vehicle parts damage correlation density model may be classified into the risk prompt rule class, and are intercepted or passed based on subsequent operations of the user.

As shown in FIG. 4, the risk interception rule class mainly lies in these items of 1 to 9, and the risk degree is particularly high, which is enough to be characterized as an assessment risk. The risk prompt rule class mainly lies in these items of 10 to 14, and the risk degree is smaller than that of the risk interception rule class, which belongs to a highly suspected risk, requires the loss assessor to verify the authenticity and accuracy of the loss again, and needs to explain the sufficient reasons for the assessment. In addition, in the rightmost column in FIG. 4, the bases of the corresponding risk rules are also explained accordingly. All of these explanations in FIG. 4 may, for example, be correspondingly displayed in the risk control report.

According to the implemented vehicle accident loss assessment risk control method above, the risk items are assigned risk levels and are controlled in different ways. Compared with all risk items being followed up by the user, the operational burden of the user can be reduced, and the high-risk items can be effectively and directly filtered out.

With the above vehicle accident loss assessment risk control method according to the first aspect of the presently disclosed subject matter, as a risk control calculation basis, the pre-established risk algorithm model has at least five dimensions of models, namely, a vehicle collision portion algorithm model, a vehicle collision portion damage degree algorithm model, a vehicle parts damage correlation density model, a vehicle original standard configuration information model, and a vehicle parts standard maintenance process model. Four aspects, i.e., the collision portion and damage degree of the vehicle accident, the accident damage correlation density between the parts, the original standard configuration and the maintenance process are comprehensively considered. Based on the data of the historical real cases, machine learning is carried out according to the contents of the vehicle loss assessment report, which can identify the vehicle collision portion and the damage degree; through the data mining algorithm, the probability calculation can be carried out on the events that do not result in parts damages for different brands of vehicle models, different collision portions, and different collision damage degrees; the big data standardization is carried out on vehicle original configuration data, parts data, maintenance technical data, maintenance process standards and the like, which can form a set of big data rules for loss assessment risk identification and judgment. Therefore, a comprehensive, reliable, accurate and intelligent risk control can be carried out, which improves the risk control capability.

Moreover, with the above vehicle accident loss assessment risk control method according to the first aspect of the presently disclosed subject matter, an efficient, intelligent and convenient vehicle accident loss risk control tool is provided for the industry. It breaks through the mode and concept of the traditional vehicle accident loss risk control, and innovates the technology, i.e., innovates from the traditional rule of thumb to the big data mining analysis. The manual experience audit is transformed into the machine audit, which greatly improves the audit efficiency, saves the claims cost in the insurance industry, and avoids the waste of social wealth. A set of perfect risk control system is formed based on the AI artificial intelligence, industry big data standardization and big data mining analysis, which solves the pain points of the industry.

Figure 5:
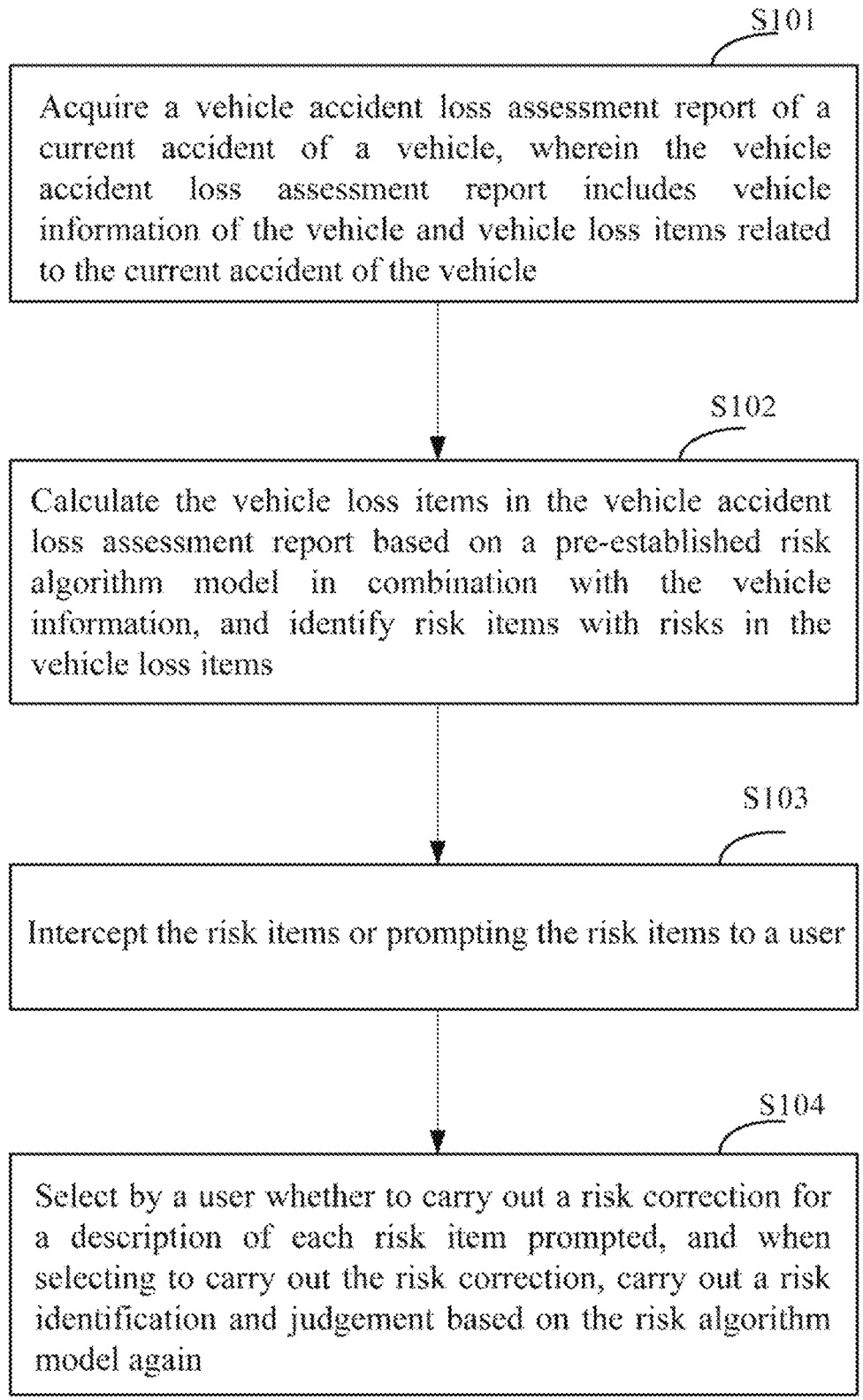
FIG. 5 is a schematic diagram of a further preferred flow of a vehicle accident loss assessment risk control method according to an embodiment of the presently disclosed subject matter.

In addition, as shown in FIG. 5, in the vehicle accident loss assessment risk control method of this embodiment, after Step S103, the user selects whether to carry out a risk correction for the descriptions of each risk item in the risk control report, and when selecting to carry out the risk correction, carries out a risk identification and judgement based on the risk algorithm model again, which can achieve the calibration and cycle control of the risk items, and improve the operability and accuracy.

Figure 6:
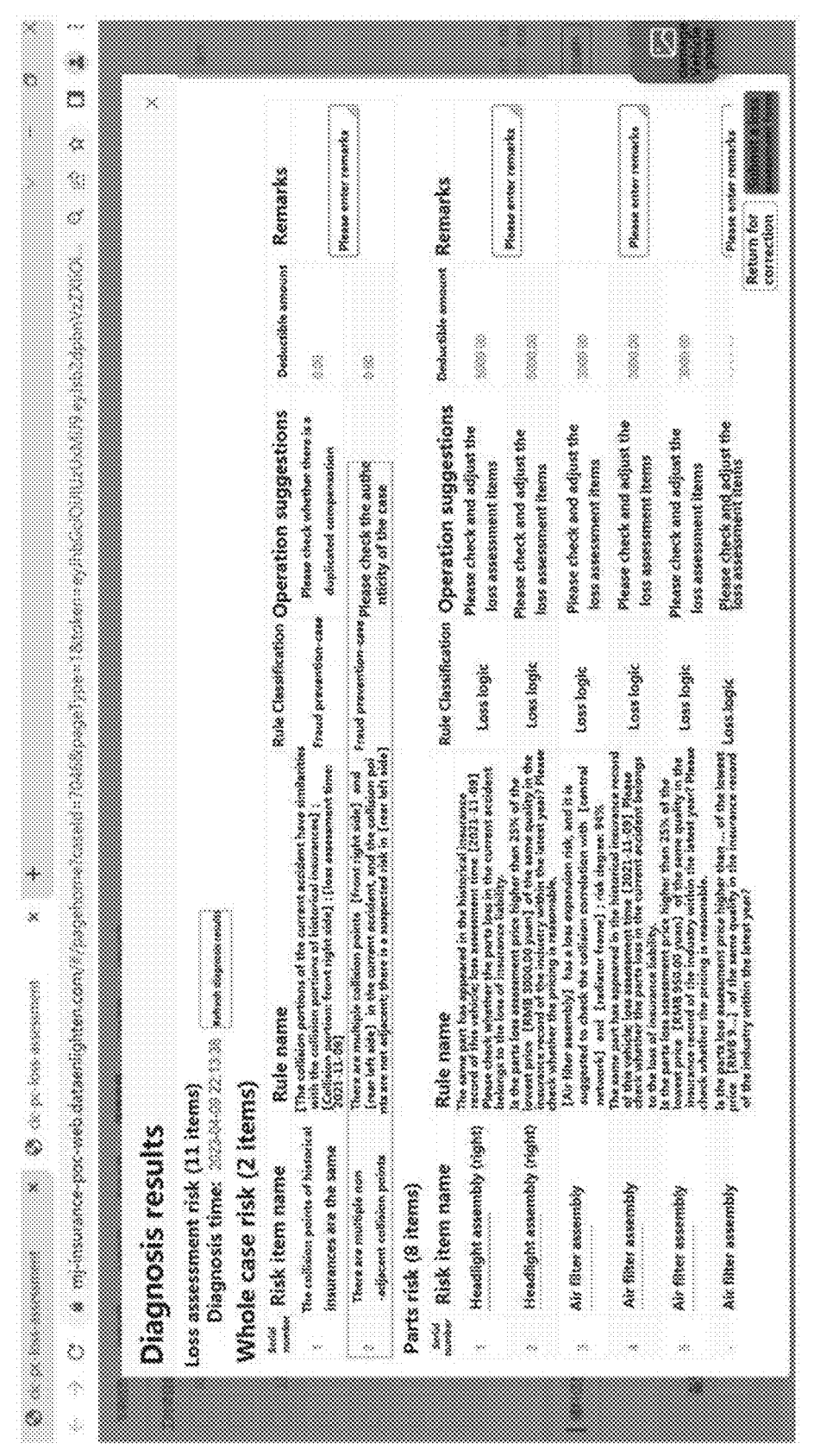
Figure 7:
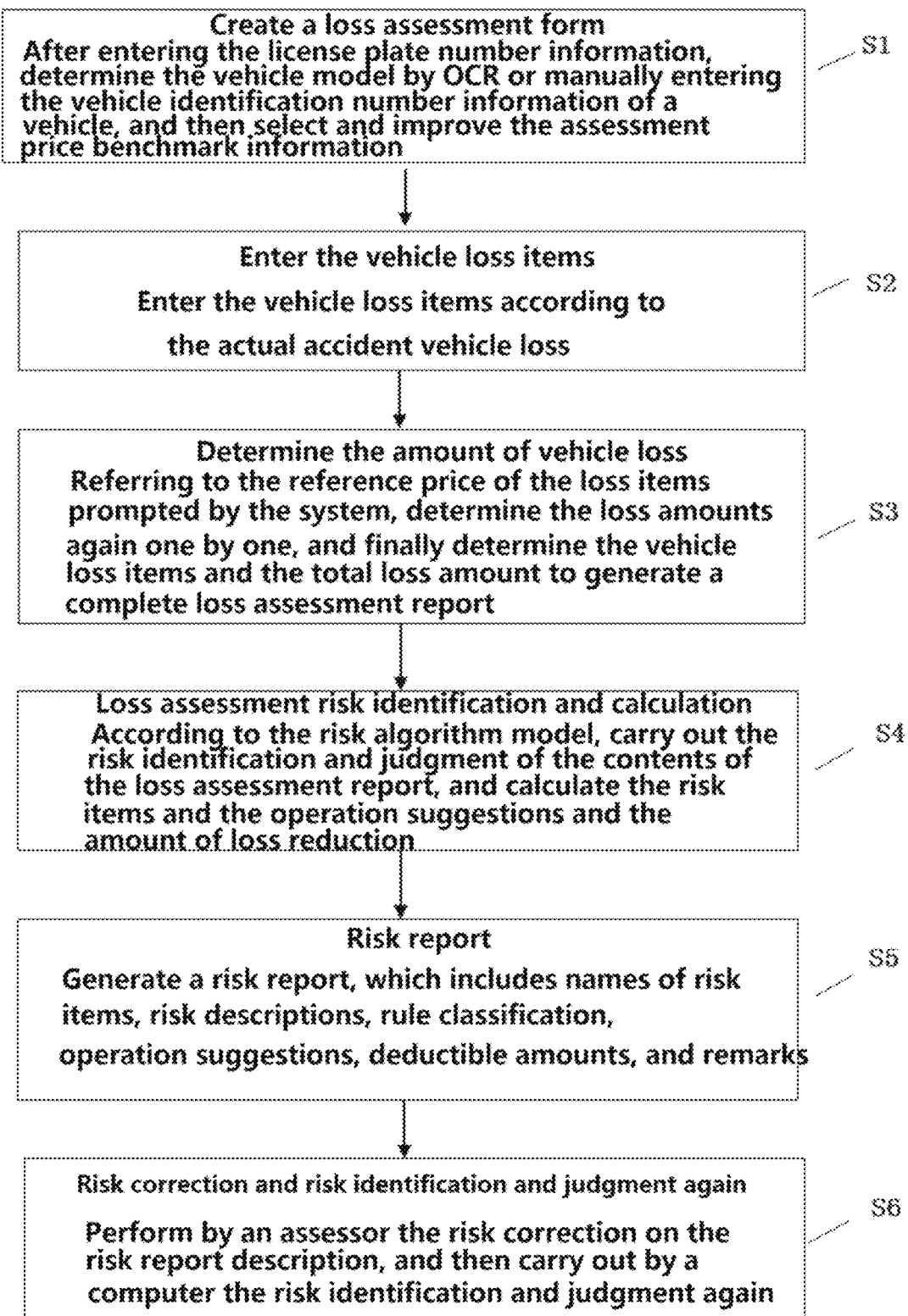
FIG. 7 is a schematic diagram of a flow in an example of a vehicle accident loss assessment risk control method according to an embodiment of the presently disclosed subject matter.

The basic idea of the vehicle accident loss assessment risk control method according to the embodiment of the presently disclosed subject matter has been described above. Hereinafter, a clearer description will be made with reference to FIG. 6 to FIG. 7 by way of example to facilitate the understanding. However, it should be understood by those skilled in the art that this example is not limiting, but is merely an example.

Firstly, users may request to create a vehicle accident loss assessment form within the system. Creating the vehicle accident loss assessment form is, for example, a process of entering basic vehicle information to generate a loss assessment task. In this example, a user (an assessor) enters the home page of an APP using a mobile device such as a mobile phone or enters the home page of a webpage using a desktop computer. Through OCR (Optical Character Recognition) or manual input of the license plate number and the vehicle identification number, the system performs the vehicle model analysis of the vehicle identification number, and identifies the vehicle identity to obtain vehicle information. Then, the user selects the maintenance enterprise (4S shop, repair shop, etc.), selects and improves the assessment price benchmark information, thereby creating an initial vehicle accident loss assessment report (S1).

After receiving a request for creating a vehicle accident loss assessment report, the system will pop up an entry page to the user. In this page, the user can enter the vehicle loss items (S2), such as the name, usage amount, maintenance process (replacement, disassembly and assembly, paint spraying, maintenance, low carbon, etc.), and the like of the damaged parts. For example, in this example, enter in an input box: a right headlight air filter, a front bumper replacement and a right front fender paint spraying, then the system performs intelligent semantic analysis and recognition, and automatically clicks to select: a headlight assembly (right) [parts] [replacement], an air filter assembly [parts] [replacement], a front bumper crust [parts] [replacement], and a front fender (right) [paint spraying], thereby determining the vehicle loss items. At the same time, the system automatically brings out the original code, the usage amount of a single vehicle, the remarks, the factory guide price, and the system reference price of the parts.

Thereafter, the assessor refers to the reference price of the loss items prompted by the system, determines the loss amounts again one by one, and finally determines the vehicle loss items and the total loss amount to generate a complete vehicle accident loss assessment report (S3).

At this time, the system acquires the vehicle accident loss assessment report, and uses the vehicle collision portion algorithm model, the vehicle collision portion damage degree algorithm model, the vehicle parts damage correlation density model, the vehicle original standard configuration information model and the vehicle parts standard maintenance process model to perform the corresponding loss assessment risk identification and calculation based on the vehicle information and the damaged parts information therein, so as to perform the risk identification and judgment on the contents in the vehicle accident loss assessment report according to these risk algorithm models, and calculate the risk items and the operation suggestions and the loss reduction amounts (S4).

After calculation, the system automatically generates a risk report (S5). The report includes names of risk items, risk descriptions, rule classification, operation suggestions, deductible amounts, and remarks (see FIG. 6). For the interception rule class risks, the system may perform a forced interception during the entry stage of the loss items; for the prompt rule class risks, the assessor should be able to perform the review and confirmation again, or correct the error assessment, or indicate the sufficient reason for the assessment (S6) according to the risk assessment report.

In the technical solution of the presently disclosed subject matter, artificial intelligence can be used to automatically perform the risk control. One of the cores of the artificial intelligence is to model the damage forms of vehicle collisions, conduct machine learning with a large amount of historical data, and conduct big data mining and analysis to realize the correlation algorithm between the vehicle collision damage model and the loss details. Specifically, machine learning is carried out according to the contents of the vehicle accident loss assessment report to identify the vehicle collision portion and the damage degree; through the data mining algorithm, the probability calculation is carried out on the events that do not result in parts damages for different brands of vehicle models, different collision portions, and different collision damage degrees; and the big data standardization is carried out on vehicle original configuration data, parts data, maintenance technical data, maintenance process standards and the like to form a set of big data rules for loss assessment risk identification and judgment.

With the vehicle accident loss assessment risk control method of the presently disclosed subject matter, an efficient, intelligent and convenient vehicle accident loss risk control tool is provided. It breaks through the mode and concept of the traditional vehicle accident loss risk control, and innovates from the traditional rule of thumb to the big data mining analysis. The manual experience audit is transformed into the machine audit, which greatly improves the audit efficiency, saves the claims cost in the insurance industry, and avoids the waste of social wealth. A set of perfect risk control system is formed based on the AI artificial intelligence, industry big data standardization and big data mining analysis, which solves the pain points of the industry.

Figure 8:
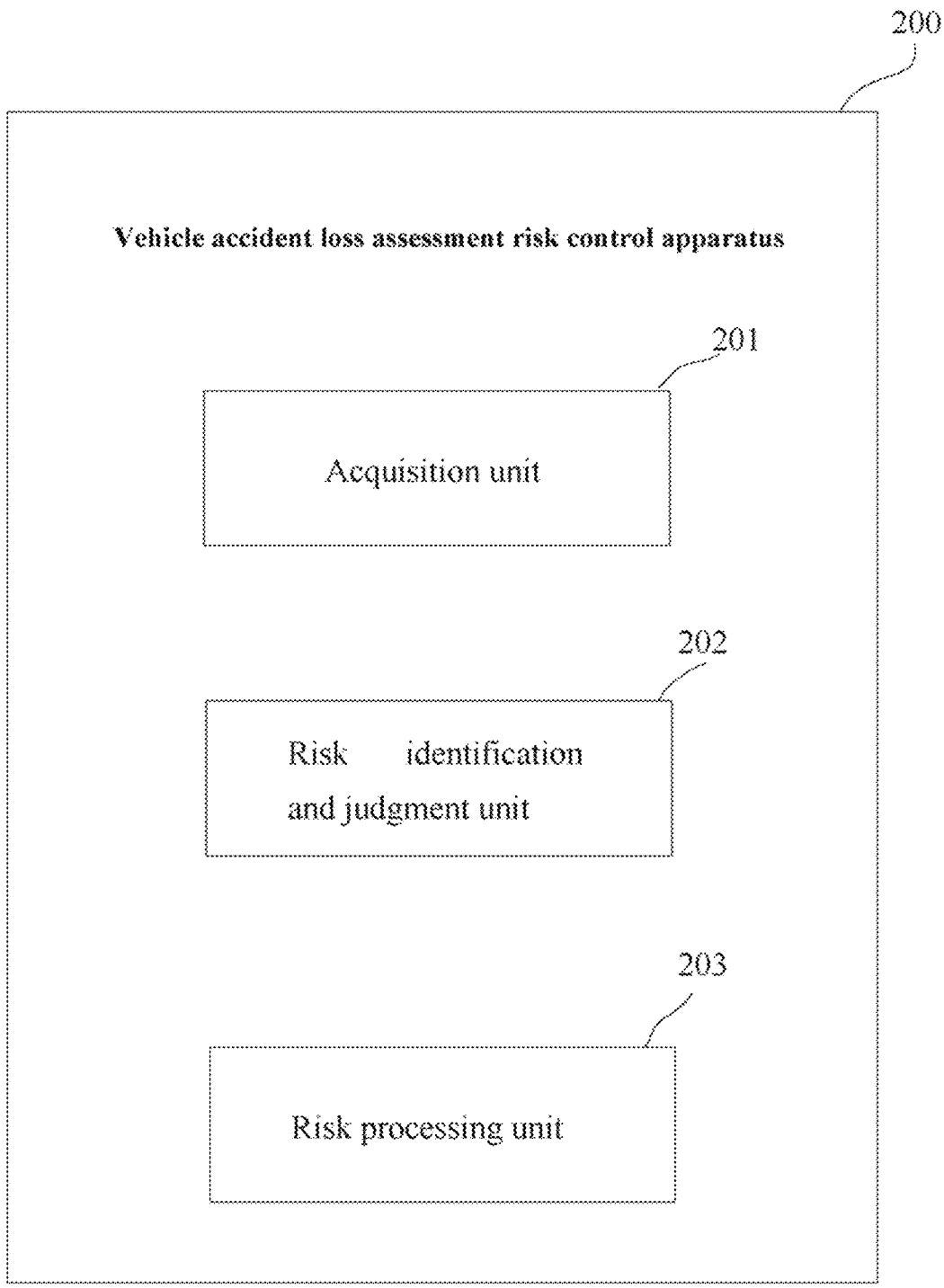
FIG. 8 is a schematic diagram of main configurations of a vehicle accident loss assessment risk control apparatus according to an embodiment of the presently disclosed subject matter.

An embodiment of the presently disclosed subject matter further provides a vehicle accident loss assessment risk control apparatus, as specifically described in FIG. 8. The vehicle accident loss assessment risk control apparatus 200 in this embodiment includes: an acquisition unit 201, configured to acquire a vehicle accident loss assessment report of a current accident of a vehicle, wherein the vehicle accident loss assessment report includes vehicle information of the vehicle and vehicle loss items related to the current accident of the vehicle; a risk identification and judgment unit 202, configured to calculate the vehicle loss items in the vehicle accident loss assessment report based on a pre-established risk algorithm model in combination with the vehicle information, and identify risk items with risks in the vehicle loss items, wherein the risk items are items that are judged not to belong to the current vehicle accident loss or assessed as unreasonable; and a risk processing unit 203, configured to intercept the risk items or prompt the risk items to a user.

A vehicle accident loss assessment risk control apparatus 200 according to an embodiment of the presently disclosed subject matter can achieve the same technical effect as the vehicle accident loss assessment risk control method in the first aspect. Although not described here, the vehicle accident loss assessment risk control apparatus 200 can further perform various processes of the vehicle accident loss assessment risk control method in the first aspect.

Figure 9:
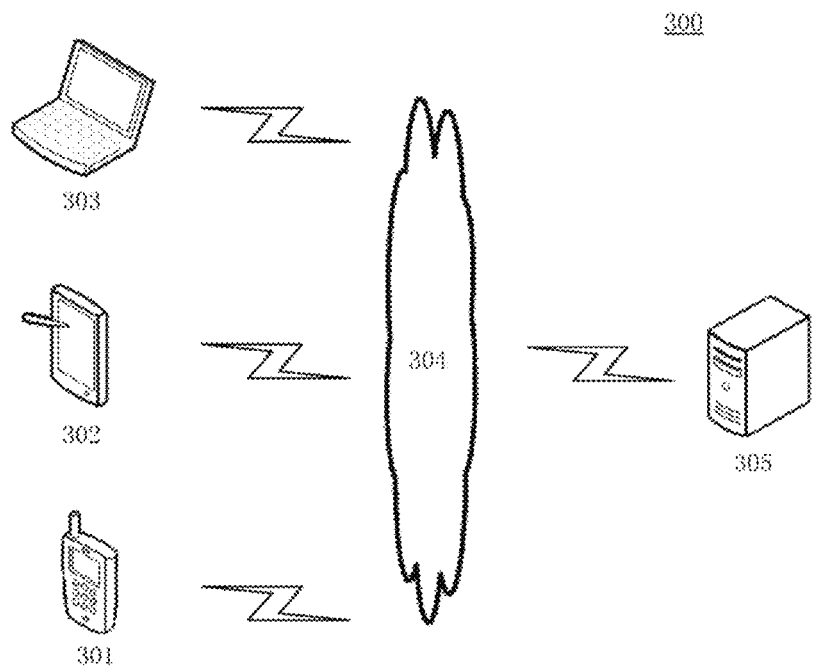
FIG. 9 is a diagram of an exemplary system architecture to which embodiments of the presently disclosed subject matter may be applied.

FIG. 9 shows an exemplary system architecture 300, to which the vehicle accident loss assessment risk control method or vehicle accident loss assessment risk control apparatus according to an embodiment of the presently disclosed subject matter may be applied.

As shown in FIG. 9, the system architecture 300 may include terminal devices 301, 302 and 303, a network 304 and a server 305. The network 304 is configured to provide a medium of a communication link between the terminal devices 301, 302 and 303 and the server 305. The network 304 may include various connection types, such as wired, wireless communication links or optical fiber cables, etc.

The user may use the terminal devices 301, 302 and 303 to interact with the server 305 through the network 304 to receive or send messages, etc. Various communication client applications may be installed on the terminal devices 301, 302 and 303, such as vehicle loss assessment class applications, web browser applications, search class applications, instant messaging tools, etc. (examples only).

The terminal devices 301, 302 and 303 may be various electronic devices having display screens and supporting webpage browsing, including but not limited to smartphones, tablets, laptops, and desktop computers, etc.

The server 305 may be a server that provides various services, such as a background management server (only an example) that provides a data supports for the vehicle identification number entered by users using the terminal devices 301, 302 and 303. The background management server may perform analyzing and other processing on the received data such as a product information query request, and feed the processing results (such as vehicle brand, model information-only examples) back to the terminal devices.

It should be noted that the vehicle accident loss assessment risk control method provided in the embodiment of the presently disclosed subject matter is generally executed by the server 305, and accordingly, the vehicle accident loss assessment risk control apparatus is generally provided in the server 305.

It should be understood that the numbers of the terminal devices, networks and servers in FIG. 9 are merely schematic. According to implementation needs, there may be any number of terminal devices, networks, and servers.

Figure 10:
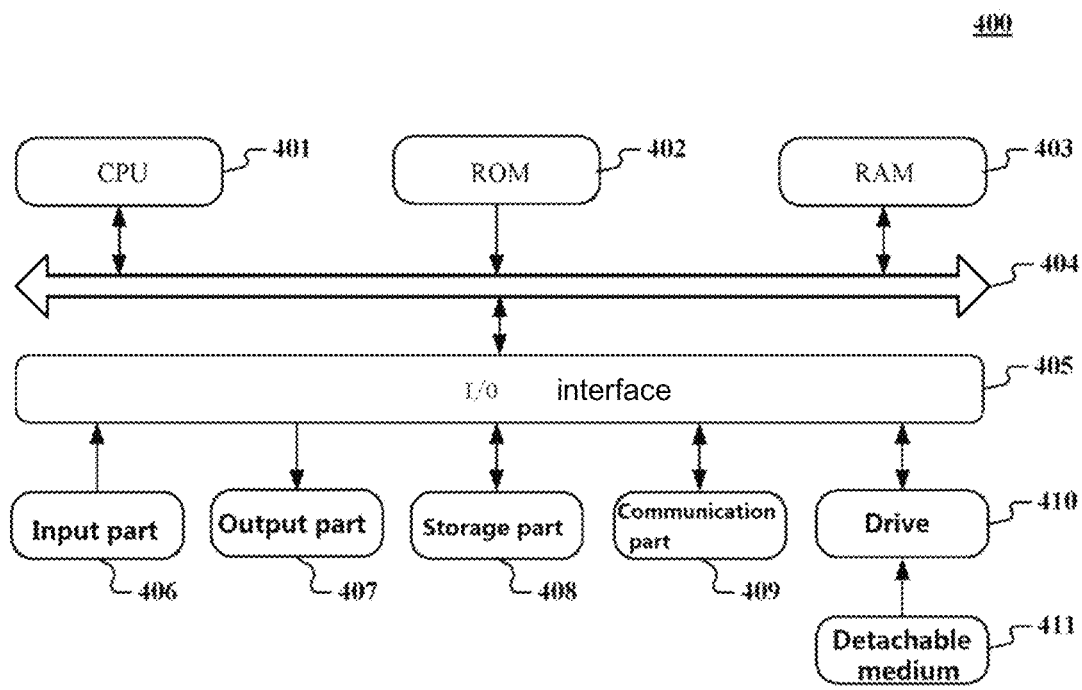
FIG. 10 is a schematic structural diagram of a computer system suitable for implementing a terminal device or a server according to an embodiment of the presently disclosed subject matter.

Reference is made below to FIG. 10, which shows a schematic structural diagram of a computer system 400 suitable for implementing a terminal device according to an embodiment of the presently disclosed subject matter. The terminal device shown in FIG. 10 is merely an example and should not bring any limitation to the functions and use ranges of the embodiments of the presently disclosed subject matter.

As shown in FIG. 10, the computer system 400 includes a central processing unit (CPU) 401 that may perform various appropriate actions and processing according to programs stored in a read-only memory (ROM) 402 or programs loaded from a storage part 408 into a random access memory (RAM) 403. Various programs and data required by the operation of system 400 are also stored in RAM 403. CPU 401, ROM 402 and RAM 403 are connected to one another through bus 404. Input/output (I/O) interface 405 is also connected to bus 404.

The following components are connected to the I/O interface 405: an input part 406 including a keyboard, a mouse, etc.; an output part 407 including, for example, a cathode ray tube (CRT), a liquid crystal display (LCD), etc., and a speaker, etc.; a storage part 408 including a hard disk, etc.; and a communication part 409 including a network interface card such as a LAN card, a modem, etc. The communication part 409 performs communication processing via a network such as the Internet. A drive 410 is also connected to the I/O interface 405 as required. A detachable medium 411, such as a magnetic disk, an optical disk, a magneto-optical disk, a semiconductor memory, etc., is installed on the drive 410 as required so that the computer programs read therefrom can be installed into the storage part 408 as required.

In particular, according to the embodiments disclosed in the presently disclosed subject matter, the process described above with reference to the flowchart may be implemented as a computer software program. For example, embodiments disclosed in the presently disclosed subject matter include a computer program product, which includes a computer program carried on a computer readable medium, and the computer program contains a program code for performing the method shown in the flowchart. In such embodiments, the computer program may be downloaded and installed from the network via the communication part 409, and/or installed from the detachable medium 411. When the computer program is executed by the central processing unit (CPU) 401, the above functions defined in the system of the presently disclosed subject matter are executed.

It should be noted that the computer readable medium shown in the presently disclosed subject matter may be a computer-readable signal medium or a computer-readable storage medium or any combination of the above two. The computer-readable storage medium may be, for example, but is not limited to an electrical, magnetic, optical, electromagnetic, infrared, or semiconductor system, apparatus, or device, or any combination of the above. More specific examples of the computer-readable storage medium may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the presently disclosed subject matter, the computer-readable storage medium may be any tangible medium that contains or stores a program that may be used by or in combination with an instruction execution system, apparatus, or device. Moreover, in the presently disclosed subject matter, the computer-readable signal medium may include a data signal propagated in a baseband or as part of a carrier, where a computer-readable program code is carried. Such a propagated data signal may take a variety of forms, including but not limited to an electromagnetic signal, an optical signal, or any suitable combination of the above. The computer-readable signal medium may also be any computer-readable medium other than a computer-readable storage medium, and the computer-readable medium may send, propagate, or transmit a program for use by or in conjunction with an instruction execution system, apparatus, or device. The program code contained on the computer-readable medium may be transmitted by any suitable medium, including but not limited to: wireless, wire, optical cable, RF, etc., or any suitable combination of the above.

The flowcharts and block diagrams in the accompanying drawings illustrate the system architectures, functions and operations that can be possibly implemented by the system, method and computer program product according to various embodiments of the presently disclosed subject matter. In this regard, each block in the flowcharts or block diagrams may represent a module, a program segment, or part of a code, and the above module, program segment, or part of a code includes one or more executable instructions for implementing specified logical functions. It should also be noted that in some alternative implementations, functions marked in the blocks may also occur in an order different from that marked in the accompanying drawings. For example, two blocks represented in succession may actually be executed in parallel, and sometimes they may also be executed in an inverse order, which depends on involved functions. It should also be noted that each block in the block diagrams or flowcharts as well as a combination of blocks in the block diagrams or flowcharts may be implemented using a special hardware-based system that executes specified functions or operations, or using a combination of special hardware and computer instructions.

The units involved and described in the embodiments of the presently disclosed subject matter may be implemented in a software manner, and may also be implemented in a hardware manner. The described units may also be provided in a processor, for example, may be described as: a processor including an acquisition unit, a risk identification and judgment unit, and a risk processing unit. Among them, the names of these units do not constitute a limitation on the units themselves in certain cases. For example, the risk identification and judgment unit may also be described as "a unit configured to request the connected server to perform risk identification and judgment on vehicle accident loss assessment information".

As another aspect, the presently disclosed subject matter further provides a computer-readable medium, which may be contained in the devices described in the above embodiments, and may also exist alone, without being assembled into the devices. The above computer-readable medium carries one or more programs, and when the above one or more programs are executed by one of the devices, the device includes: acquiring a vehicle accident loss assessment report of a vehicle, wherein the vehicle accident loss assessment report includes vehicle information of the vehicle and vehicle loss item information related to the vehicle accident; calculating the vehicle loss item information in the vehicle accident loss assessment report based on a pre-established risk algorithm model in combination with the vehicle information, and judging risk items with risks in the vehicle loss item information of the vehicle accident loss assessment report, wherein the risk items refer to the items that are judged not to belong to the current vehicle accident loss or assessed as unreasonable; and intercepting the risk items or generating a risk control report and previewing it to the user.

The presently disclosed subject matter breaks through the mode and concept of the traditional vehicle accident loss risk control, innovates from the traditional rule of thumb to big data mining and analysis, provides an efficient, intelligent and convenient vehicle accident loss assessment risk control technology, saves the claims cost in the insurance industry, and avoids the waste of social wealth.

The above specific embodiments do not constitute a limitation on the protection scope of the presently disclosed subject matter. Those skilled in the art should understand that various modifications, combinations, sub-combinations and substitutions may occur depending on design requirements and other factors. Any modification, equivalent replacement and improvement made within the spirit and principle of the presently disclosed subject matter shall fall within the protection scope of the presently disclosed subject matter.

The invention claimed is:

1. A vehicle accident loss assessment risk control method which is implemented by computer, comprising:
   acquiring a vehicle accident loss assessment report of a current accident of a vehicle, wherein the vehicle accident loss assessment report includes vehicle information of the vehicle and vehicle loss items related to the current accident of the vehicle;
   calculating the vehicle loss items in the vehicle accident loss assessment report based on a pre-established risk algorithm model in combination with the vehicle information, and identifying risk items with risks in the vehicle loss items; and
   intercepting the risk items,
   wherein the pre-established risk algorithm model comprises: a vehicle collision portion damage degree algorithm model, which is established in following steps:
      manually marking the collision portions and damage degrees of historical vehicle accident cases according to historical vehicle accident loss assessment reports of various types of vehicles in combination with loss photos of historical vehicle accident loss assessments; and
      machine learning by a computer the historical vehicle accident loss assessment reports of various types of vehicles and a portrait of the collision portions and the damage degrees according to the collision portions and the damage degrees manually marked for the historical vehicle accident cases, so as to obtain a correspondence between the collision portions and the damage degrees and the vehicle loss items, and
   wherein calculation of the vehicle loss items in the vehicle accident loss assessment report based on the vehicle collision portion damage degree algorithm model comprises:
      calculating damage degrees of the collision portions of the current accident according to the vehicle loss items in the acquired current vehicle accident loss assessment report of the vehicle and the collision portions calculated by a vehicle collision portion algorithm model, so as to determine a parts loss boundary under the collision portions and the damage degrees, judge whether the damaged parts include any damaged part outside the parts loss boundary, and identify the damaged part outside the parts loss boundary as the risk item when the judgment result is yes, and
   wherein the intercepting the risk items comprises automatically forcing confirmation or correction of a loss item of the vehicle loss items in response to the loss item being outside the parts loss boundary.

2. The vehicle accident loss assessment risk control method according to claim 1, wherein the pre-established risk algorithm model comprises:
   the vehicle collision portion algorithm model, and the vehicle collision portion algorithm model is established in following steps:

virtualizing the vehicle into a corresponding graph in a three-dimensional coordinate system according to the vehicle information of the vehicle, and giving a three-dimensional coordinate to a vehicle part according to an actual installation location of the vehicle part in the vehicle; and dividing the vehicle into different collision portions, and creating three-dimensional coordinate data for each of the collision portions according to the vehicle information, so as to establish a correspondence between the collision portion and the vehicle part.

3. The vehicle accident loss assessment risk control method according to claim 2, wherein, calculation of the vehicle loss items in the vehicle accident loss assessment report based on the vehicle collision portion algorithm model comprises at least one of the following:

calculating collision portions of the current accident according to the vehicle loss items in the acquired current vehicle accident loss assessment report of the vehicle, and comparing the current vehicle accident loss assessment report of the vehicle with a historical vehicle accident loss assessment report of the vehicle to calculate whether there are same collision portions or same damaged parts, and to identify the same collision portions or damaged parts as risk items when a calculation result is yes; and when a plurality of collision portions of the vehicle in the current accident are calculated, judging whether there is any collision portion that does not conform to a collision logic among the plurality of collision portions, and when a judgment result is yes, identifying the collision portion that does not conform to the collision logic as the risk item.

4. The vehicle accident loss assessment risk control method according to claim 3, further comprising:

selecting by a user whether to carry out a risk correction for a description of each risk item prompted, after a risk is prompted to the user, and when selecting to carry out the risk correction, carrying out a risk identification and judgement based on the risk algorithm model again.

5. The vehicle accident loss assessment risk control method according claim 2, further comprising:

selecting by a user whether to carry out a risk correction for a description of each risk item prompted, after a risk is prompted to the user, and when selecting to carry out the risk correction, carrying out a risk identification and judgement based on the risk algorithm model again.

6. The vehicle accident loss assessment risk control method according to claim 1, wherein the pre-established risk algorithm model comprises:

a vehicle parts damage correlation density model, which is established in following steps:

taking records in historical vehicle accident loss assessment reports of various types of vehicles as sample data to conduct a big data mining analysis, and calculate and store a damage correlation density between various vehicle parts when the vehicle is damaged in an accident, wherein the damage correlation density comprises at least one of the following: when one vehicle part is damaged and thus becomes a damaged part, a probability that another vehicle part also becomes a damaged part accordingly; and when one vehicle part is damaged and thus becomes a damaged part, a probability that another vehicle part will not become a damaged part.

7. The vehicle accident loss assessment risk control method according to claim 6, wherein, calculation of the vehicle loss items in the vehicle accident loss assessment report based on the vehicle parts damage correlation density model comprises at least one of the following:

identifying whether another part having a strong correlation with one damaged part included in the vehicle loss items is also recorded in the vehicle loss items as a damaged part, according to the vehicle loss items in the acquired current vehicle accident loss assessment report of the vehicle in combination with the damage correlation density, and identifying the one damaged part as the risk item when an identification result is unrecorded, wherein the strong correlation means that when one vehicle part is damaged and thus becomes a damaged part, a probability that another vehicle part also becomes a damaged part accordingly is higher than a predetermined threshold.

8. The vehicle accident loss assessment risk control method according to claim 7, further comprising:

selecting by a user whether to carry out a risk correction for a description of each risk item prompted, after a risk is prompted to the user, and when selecting to carry out the risk correction, carrying out a risk identification and judgement based on the risk algorithm model again.

9. The vehicle accident loss assessment risk control method according claim 6, further comprising:

selecting by a user whether to carry out a risk correction for a description of each risk item prompted, after a risk is prompted to the user, and when selecting to carry out the risk correction, carrying out a risk identification and judgement based on the risk algorithm model again.

10. The vehicle accident loss assessment risk control method according to claim 1, wherein the pre-established risk algorithm model comprises:

a vehicle original standard configuration information model, which is established by conducting big data standardization on vehicle original configuration information, wherein the vehicle original configuration information comprises at least one of the following: vehicle original configuration data, parts codes, parts usage amount of a single vehicle, relationships between parts assembly and accessories, parts guide prices and usage amount of auxiliary materials.

11. The vehicle accident loss assessment risk control method according to claim 10, wherein, calculation of the vehicle loss items in the vehicle accident loss assessment report based on the vehicle original standard configuration information model comprises:

identifying, according to the vehicle information, vehicle original configuration information corresponding to the vehicle using the vehicle original standard configuration information model, and comparing information of the damaged parts in the vehicle loss items with the vehicle original configuration information, and when a comparison result of the two is inconsistent, identifying the damaged parts that are inconsistent as risk items.

12. The vehicle accident loss assessment risk control method according to claim 11, further comprising:

selecting by a user whether to carry out a risk correction for a description of each risk item prompted, after a risk is prompted to the user, and when selecting to carry out the risk correction, carrying out a risk identification and judgement based on the risk algorithm model again.

13. The vehicle accident loss assessment risk control method according to claim 10, further comprising:
selecting by a user whether to carry out a risk correction for a description of each risk item prompted, after a risk is prompted to the user, and when selecting to carry out the risk correction, carrying out a risk identification and judgement based on the risk algorithm model again.

14. The vehicle accident loss assessment risk control method according to claim 1, wherein the pre-established risk algorithm model comprises:
a vehicle parts standard maintenance process model, which is established by conducting big data standardization on maintenance technical data and maintenance process standards for vehicle parts.

15. The vehicle accident loss assessment risk control method according to claim 14, wherein,
calculation of the vehicle loss items in the vehicle accident loss assessment report based on the vehicle parts standard maintenance process model comprises:
comparing, according to the vehicle information, maintenance information of the damaged parts in the vehicle loss items with the maintenance technical data and maintenance process standards by using the vehicle parts standard maintenance process model, and when a comparison result of the two is inconsistent, identifying the damaged parts that are inconsistent as risk items.

16. The vehicle accident loss assessment risk control method according to claim 15, further comprising:
selecting by a user whether to carry out a risk correction for a description of each risk item prompted, after a risk is prompted to the user, and when selecting to carry out the risk correction, carrying out a risk identification and judgement based on the risk algorithm model again.

17. The vehicle accident loss assessment risk control method according to claim 14, further comprising:
selecting by a user whether to carry out a risk correction for a description of each risk item prompted, after a risk is prompted to the user, and when selecting to carry out the risk correction, carrying out a risk identification and judgement based on the risk algorithm model again.

18. The vehicle accident loss assessment risk control method according to claim 1, further comprising:
selecting by a user whether to carry out a risk correction for a description of each risk item prompted, after a risk is prompted to the user, and when selecting to carry out the risk correction, carrying out a risk identification and judgement based on the risk algorithm model again.

19. A vehicle accident loss assessment risk control apparatus, comprising:
one or more processors; and
a storage device, configured to store one or more programs that, when executed by the one or more processors, cause the one or more processors to:
acquire a vehicle accident loss assessment report of a current accident of a vehicle, wherein the vehicle accident loss assessment report includes vehicle information of the vehicle and vehicle loss items related to the current accident of the vehicle;
calculate the vehicle loss items in the vehicle accident loss assessment report based on a pre-established risk algorithm model in combination with the vehicle information, and identify risk items with risks in the vehicle loss items, wherein the risk items are items that are judged not to belong to the current vehicle accident loss or assessed as unreasonable; and
intercept the risk items,
wherein the pre-established risk algorithm model comprises: a vehicle collision portion damage degree algorithm model, which is established in following steps:
manually marking the collision portions and damage degrees of historical vehicle accident cases according to historical vehicle accident loss assessment reports of various types of vehicles in combination with loss photos of historical vehicle accident loss assessments; and
machine learning by a computer the historical vehicle accident loss assessment reports of various types of vehicles and a portrait of the collision portions and the damage degrees according to the collision portions and the damage degrees manually marked for the historical vehicle accident cases, so as to obtain a correspondence between the collision portions and the damage degrees and the vehicle loss items, and
wherein calculation of the vehicle loss items in the vehicle accident loss assessment report based on the vehicle collision portion damage degree algorithm model comprises:
calculating damage degrees of the collision portions of the current accident according to the vehicle loss items in the acquired current vehicle accident loss assessment report of the vehicle and the collision portions calculated by a vehicle collision portion algorithm model, so as to determine a parts loss boundary under the collision portions and the damage degrees, judge whether the damaged parts include any damaged part outside the parts loss boundary, and identify the damaged part outside the parts loss boundary as the risk item when the judgment result is yes, and
wherein the intercepting the risk items comprises automatically forcing confirmation or correction of a loss item of the vehicle loss items in response to the loss item being outside the parts loss boundary.

20. A non-transitory computer-readable medium having computer programs stored thereon, wherein the programs implement the method according to claim 1 when being executed by a processor.

* * * * *